(12) United States Patent
Chen

(10) Patent No.: US 12,542,174 B2
(45) Date of Patent: Feb. 3, 2026

(54) DYNAMIC RANDOM-ACCESS MEMORY (DRAM) DEVICE

(71) Applicant: NANYA TECHNOLOGY CORPORATION, New Taipei (TW)

(72) Inventor: Chih-Jen Chen, Kaohsiung (TW)

(73) Assignee: NANYA TECHNOLOGY CORPORATION, New Taipei (TW)

(*) Notice: Subject to any disclaimer, the term of this patent is extended or adjusted under 35 U.S.C. 154(b) by 94 days.

(21) Appl. No.: 18/603,154

(22) Filed: Mar. 12, 2024

(65) Prior Publication Data

US 2025/0292825 A1    Sep. 18, 2025

(51) Int. Cl.
*G11C 11/4099* (2006.01)
*G11C 11/4093* (2006.01)
*G11C 17/12* (2006.01)

(52) U.S. Cl.
CPC ...... *G11C 11/4093* (2013.01); *G11C 11/4099* (2013.01); *G11C 17/12* (2013.01)

(58) Field of Classification Search
CPC .................... G11C 11/4093; G11C 11/4099
USPC ........................................................ 365/149
See application file for complete search history.

(56) References Cited

U.S. PATENT DOCUMENTS

| 2003/0080774 | A1* | 5/2003 | Funaba ................. H04L 25/028 326/30 |
| 2013/0038380 | A1 | 2/2013 | Cordero et al. |
| 2013/0070540 | A1 | 3/2013 | Pyeon |
| 2015/0168972 | A1 | 6/2015 | Mathiyalagan et al. |
| 2021/0247910 | A1 | 8/2021 | Kim et al. |
| 2023/0259283 | A1 | 8/2023 | Kim et al. |
| 2023/0352077 | A1* | 11/2023 | Lee ...................... G11C 7/1057 |

FOREIGN PATENT DOCUMENTS

| TW | 202111701 | 3/2021 |
| TW | 202125773 | 7/2021 |
| TW | 202143049 | 11/2021 |
| TW | 202209325 | 3/2022 |
| TW | 202329371 | 7/2023 |
| TW | 202340995 | 10/2023 |

OTHER PUBLICATIONS

"Office Action of Taiwan Counterpart Application", issued on Jul. 9, 2025, p. 1-p. 5.
"Office Action of Taiwan counterpart Application", issued on Sep. 24, 2025, p. 1-p. 9.

* cited by examiner

*Primary Examiner* — Anthan Tran
(74) *Attorney, Agent, or Firm* — JCIPRNET

(57) ABSTRACT

A dynamic random-access memory (DRAM) device is provided. The DRAM device includes a plurality of slave DRAM chips and a master DRAM chip. Each of the plurality of slave DRAM chips includes a slave fuse circuit and a slave reference voltage generator. The slave fuse circuit provides a slave set signal according to a slave fuse setting operation of the slave fuse circuit. The slave reference voltage generator provides a slave reference voltage according to the slave set signal. The master DRAM chip controls operations of the plurality of slave DRAM chips.

11 Claims, 3 Drawing Sheets

DYNAMIC RANDOM-ACCESS MEMORY (DRAM) DEVICE

BACKGROUND

Technical Field

The disclosure generally relates to a memory device, and more particularly to a dynamic random-access memory (DRAM) device.

Description of Related Art

Generally, a dynamic random-access memory (DRAM) device includes memory chips. All of the memory chips need at least one reference voltage to determine a received signal or a received data. It should be noted, all of the memory chips need a DC current to provide the at least one reference voltage. Thus, the DRAM device having memory chips has high power consumption.

SUMMARY

The disclosure provides a dynamic random-access memory (DRAM) device having low power consumption.

The DRAM device of the disclosure includes a plurality of slave DRAM chips and a master DRAM chip. Each of the plurality of slave DRAM chips includes a slave fuse circuit and a slave reference voltage generator. The slave fuse circuit provides a slave set signal according to a slave fuse setting operation of the slave fuse circuit. The slave reference voltage generator provides a slave reference voltage according to the slave set signal. The master DRAM chip is coupled to the plurality of slave DRAM chips. The master DRAM chip controls operations of the plurality of slave DRAM chips.

Based on the above, each of the slave DRAM chips provides the slave reference voltage according to the slave fuse setting operation. In this way, a power consumption of the DRAM device could be decreased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
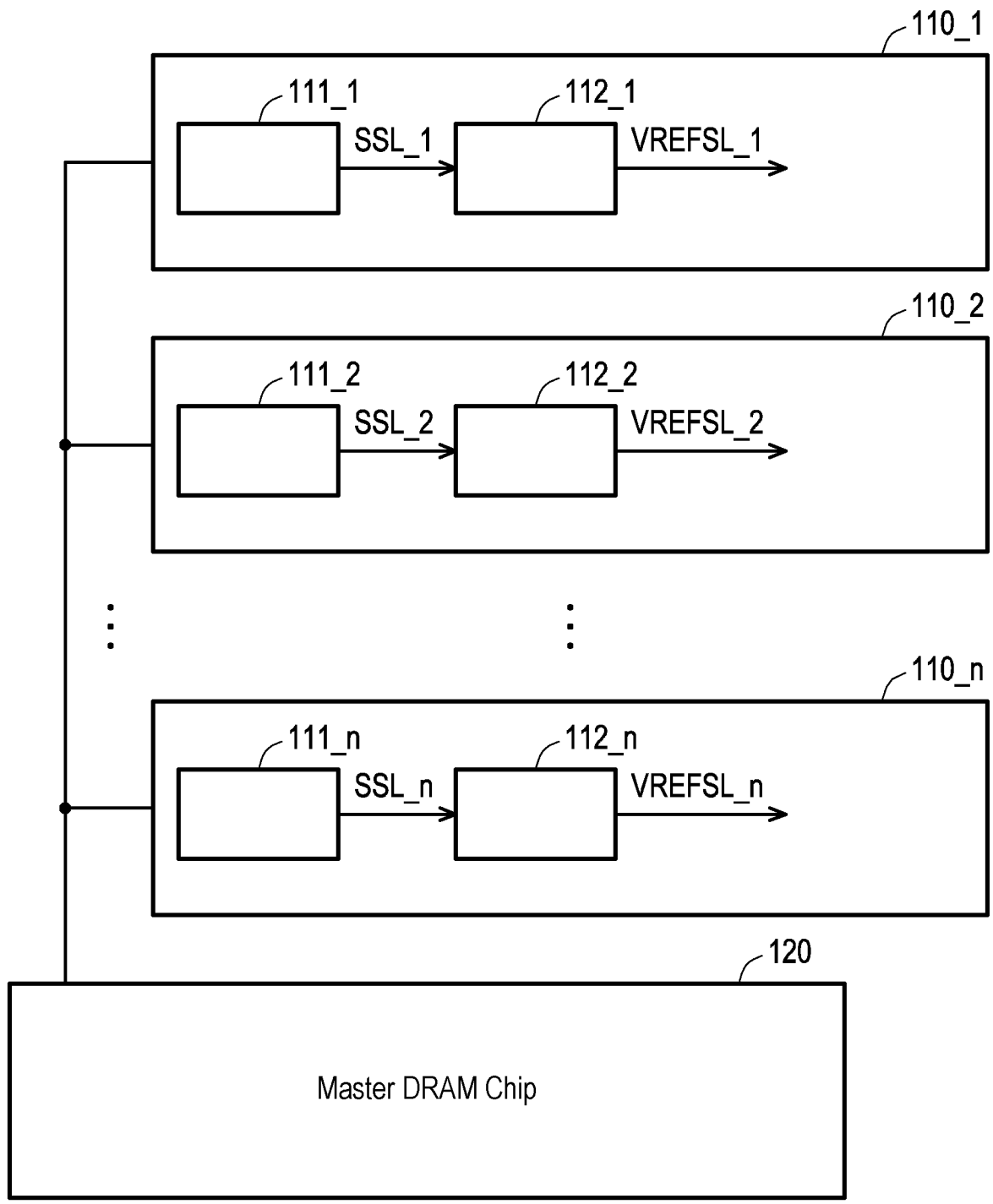
FIG. 1 illustrates a schematic diagram of a dynamic random-access memory (DRAM) device according to an embodiment of the disclosure.

Please refer to FIG. 1, FIG. 1 illustrates a schematic diagram of a dynamic random-access memory (DRAM) device according to an embodiment of the disclosure. In the embodiment, the DRAM device 100 includes slave DRAM chips 110_1 to 110_n and a master DRAM chip 120. Each of the slave DRAM chips 110_1 to 110_n includes a slave fuse circuit and a slave reference voltage generator.

For example, the slave DRAM chip 110_1 includes a slave fuse circuit 111_1 and a slave reference voltage generator 112_1. The slave fuse circuit 111_1 provides a slave set signal SSL_1 according to a slave fuse setting operation of the slave fuse circuit 111_1. The slave reference voltage generator 112_1 provides a slave reference voltage VREFSL_1 according to the slave set signal SSL_1. Furthermore, when the slave fuse setting operation of the slave fuse circuit 111_1 is finished, the slave fuse circuit 111_1 provides the slave set signal SSL_1 having a high voltage level. The slave reference voltage generator 112_1 is disabled to stop providing the slave reference voltage VREFSL_1. For example, the slave fuse setting operation is a disable setting operation of the slave DRAM chip 110_1, but the disclosure is not limited thereto. Thus, a power consumption of the slave reference voltage generator 112_1 would be very low when the slave DRAM chip 110_1 finishes the slave fuse setting operation (that is, the disable setting operation).

When the slave fuse circuit 111_1 does not perform the slave fuse setting operation, the slave reference voltage generator 112_1 is enabled to provide the slave reference voltage VREFSL_1. The slave reference voltage VREFSL_1 may be a reference voltage used to determine logic level of a received signal or a received data.

The slave DRAM chip 110_2 includes a slave fuse circuit 111_2 and a slave reference voltage generator 112_2. The slave fuse circuit 111_2 provides a slave set signal SSL_2 according to a slave fuse setting operation of the slave fuse circuit 111_2. The slave reference voltage generator 112_2 provides a slave reference voltage VREFSL_2 according to the slave set signal SSL_2. Similarly, the slave DRAM chip 110_n includes a slave fuse circuit 111_n and a slave reference voltage generator 112_n. The slave fuse circuit 111_n provides a slave set signal SSL_n according to a slave fuse setting operation of the slave fuse circuit 111_n. The slave reference voltage generator 112_n provides a slave reference voltage VREFSL_n according to the slave set signal SSL_n.

In the embodiment, the master DRAM chip 120 is coupled to the slave DRAM chips 110_1 to 110_n. The master DRAM chip 120 controls operations of the slave DRAM chips 110_1 to 110_n. For example, the master DRAM chip 120 controls write operation and read operation of the slave DRAM chips 110_1 to 110_n, but the disclosure is not limited thereto.

It should be noted, each of the slave DRAM chips 110_1 to 110_n. provides the slave reference voltage according to the slave fuse setting operation. In this way, a power consumption of the DRAM device 100 could be decreased.

In the embodiment, the slave DRAM chips 110_1 to 110_n and the master DRAM chip 120 are stacked from each other. For example, the slave DRAM chips 110_1 to 110_n and the master DRAM chip 120 are stacked to form a three-dimensional (3D) stacked DRAM structure.

Figure 2:
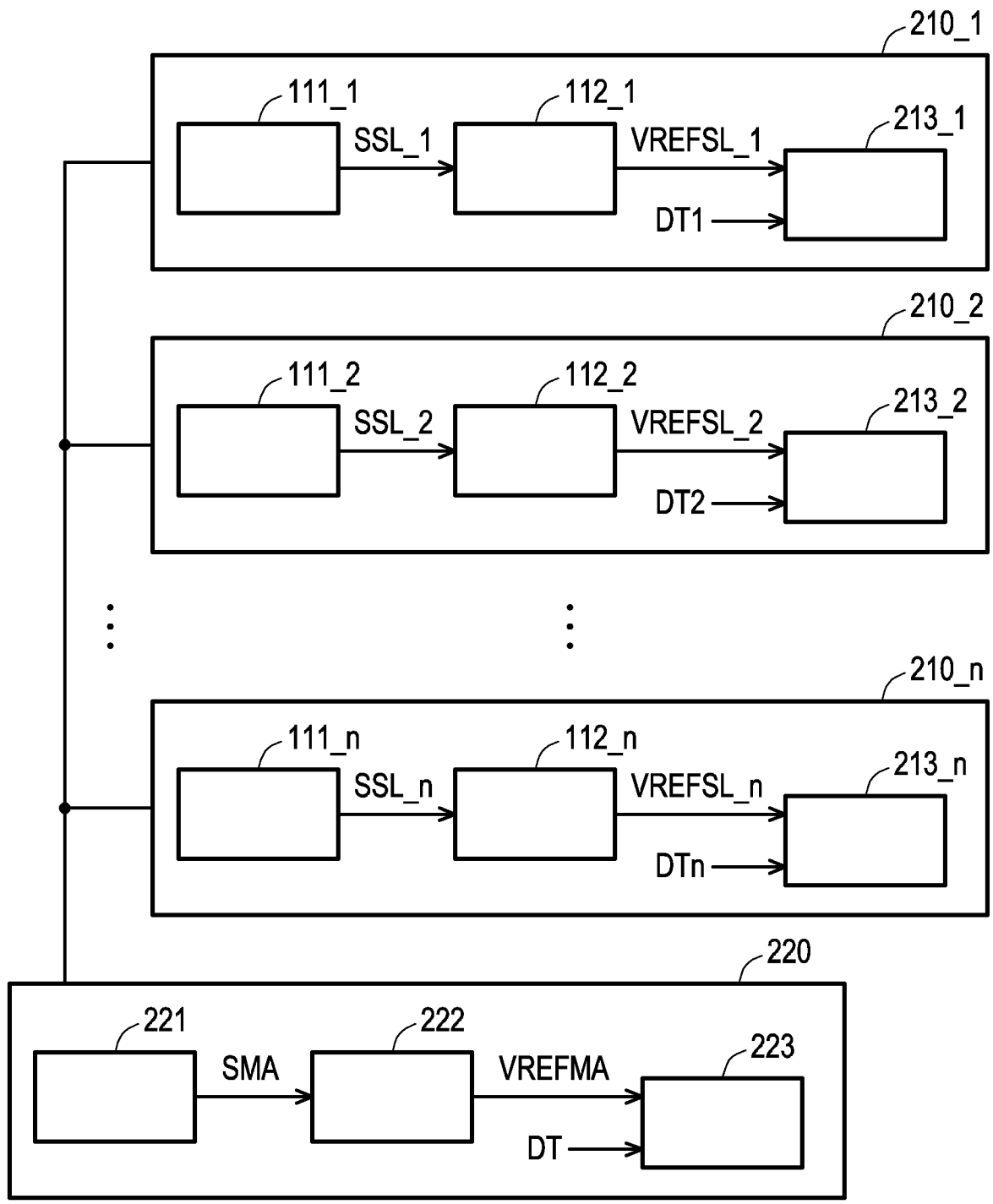
FIG. 2 illustrates a schematic diagram of a dynamic random-access memory (DRAM) device according to an embodiment of the disclosure.

Please refer to FIG. 2, FIG. 2 illustrates a schematic diagram of a dynamic random-access memory (DRAM) device according to an embodiment of the disclosure. In the embodiment, the DRAM device 200 includes slave DRAM chips 210_1 to 210_n and a master DRAM chip 220. The slave DRAM chip 210_1 includes the slave fuse circuit 111_1, the slave reference voltage generator 112_1 and a data receiver 213_1. The slave fuse circuit 111_1 and the slave reference voltage generator 112_1 have been clearly explained in the embodiments of FIG. 1, so it will not be repeated here.

In the embodiment, the data receiver 213_1 is coupled to the slave reference voltage generator 112_1. The data receiver 213_1 receives data DT1 and the slave reference voltage VREFSL_1. The data receiver 213_1 determines a logic level of the data DT1 base on the slave reference voltage VREFSL_1. For example, when a voltage value of the data DT1 is higher than a voltage value of the slave reference voltage VREFSL_1. The data receiver 213_1 determines the logic level of the data DT1 is high logic. When the voltage value of the data DT1 is lower than or equal to the voltage value of the slave reference voltage VREFSL_1. The data receiver 213_1 determines the logic level of the data DT1 is low logic. For example, the slave reference voltage VREFSL_1 may be a reference voltage "VrefDQ" of the slave DRAM chip 210_1.

The slave DRAM chip 210_2 includes the slave fuse circuit 111_2, the slave reference voltage generator 112_2 and a data receiver 213_2. The slave fuse circuit 111_2 and the slave reference voltage generator 112_2 have been clearly explained in the embodiments of FIG. 1, so it will not be repeated here. The data receiver 213_2 receives data DT2 and the slave reference voltage VREFSL_2. The data receiver 213_2 determines a logic level of the data DT2 base on the slave reference voltage VREFSL_2. Similarly, the slave DRAM chip 210_n includes the slave fuse circuit 111_n, the slave reference voltage generator 112_n and a data receiver 213_n. The slave fuse circuit 111_n and the slave reference voltage generator 112_n have been clearly explained in the embodiments of FIG. 1, so it will not be repeated here. The data receiver 213_n receives data DTn and the slave reference voltage VREFSL_n. The data receiver 213_n determines a logic level of the data DTn base on the slave reference voltage VREFSL_n.

In the embodiment, the master DRAM chip 220 includes the master fuse circuit 221 and master reference voltage generator 222. The master fuse circuit 221 provides a master set signal SMA according to a master fuse setting operation of the master fuse circuit 221. The master reference voltage generator 222 provides a master reference voltage VREFMA according to the master set signal SMA.

For example, when the master fuse setting operation of the master fuse circuit 221 is finished, the master fuse circuit 221 provides the master set signal SMA having a high voltage level. The master reference voltage generator 222 is disabled to stop providing the master reference voltage VREFMA. Thus, a power consumption of the master reference voltage generator 222 would be very low. When the master fuse circuit 221 does not perform the master fuse setting operation, the master reference voltage generator 222 is enabled to provide the master reference voltage VREFMA. The master reference voltage VREFMA may be a reference voltage used to determine logic level of a received signal or a received data.

In the embodiment, the master DRAM chip 220 further includes a data receiver 223. The data receiver 223 is coupled to the master reference voltage generator 222. The data receiver 223 receives data DT and the master reference voltage VREFMA. The data receiver 223 determines a logic level of the data DT base on the master reference voltage VREFMA. For example, when a voltage value of the data DT is higher than a voltage value of the master reference voltage VREFMA. The data receiver 223 determines the logic level of the data DT is high logic. When the voltage value of the data DT is lower than or equal to the voltage value of the master reference voltage VREFMA. The data receiver 223 determines the logic level of the data DT is low logic. For example, the master reference voltage VREFMA may be a reference voltage "VrefDQ" of the master DRAM chip 220.

Figure 3:
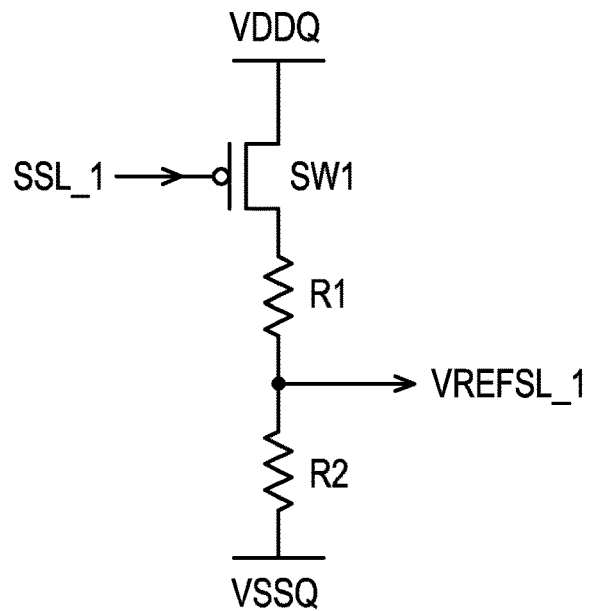
FIG. 3 illustrates a schematic diagram of a slave reference voltage generator according to an embodiment of the disclosure.

Please refer to FIG. 1 and FIG. 3, FIG. 3 illustrates a schematic diagram of a slave reference voltage generator according to an embodiment of the disclosure. In the embodiment, the slave reference voltage generator 112_1 includes a slave switch SW1 and slave resistor R1 and R2. A first terminal of the slave switch SW1 is coupled to a reference high voltage VDDQ. A control terminal of the slave switch SW1 is coupled to the slave fuse circuit 111_1. A first terminal of the slave resistor R1 is coupled to a second terminal of the slave switch SW1. A second terminal of the slave resistor R1 outputs the slave reference voltage VREFSL_1. The slave resistor R2 is coupled between the second terminal of the slave resistor R1 and a reference low voltage VSSQ. In the embodiment, the slave switch SW1 may be implemented by P-type transistor, but the disclosure is not limited thereto.

In the embodiment, when the slave fuse circuit 111_1 does not perform the slave fuse setting operation, the slave switch SW1 is turned on. When the slave fuse circuit 111_1 finishes the slave fuse setting operation, the slave switch SW1 is turned off. For example, when the slave fuse circuit 111_1 does not perform the slave fuse setting operation, the slave fuse circuit 111_1 provides the slave set signal SSL_1 having a low voltage level. Therefore, the slave switch SW1 is turned on. The slave reference voltage generator 112_1 generates the slave reference voltage VREFSL_1 according to a voltage difference between the reference high voltage VDDQ and the reference low voltage VSSQ, a resistance value of the slave resistor R1 and a resistance value of the slave resistor R2. When the slave fuse circuit 111_1 finishes the slave fuse setting operation, the slave fuse circuit 111_1 provides the slave set signal SSL_1 having a high voltage level. Therefore, the slave switch SW1 is turned off. Therefore, the slave reference voltage generator 112_1 does not generate the slave reference voltage VREFSL_1. For example, the slave fuse setting operation is a disable setting operation of the slave DRAM chip 110_1. When the slave fuse setting operation is finished, the slave reference voltage generator 112_1 does not generate the slave reference voltage VREFSL_1. In this way, when the slave DRAM chip 110_1 is disabled, the slave reference voltage generator 112_1 does not generate the slave reference voltage VREFSL_1, so as to decrease the power consumption.

Figure 4:
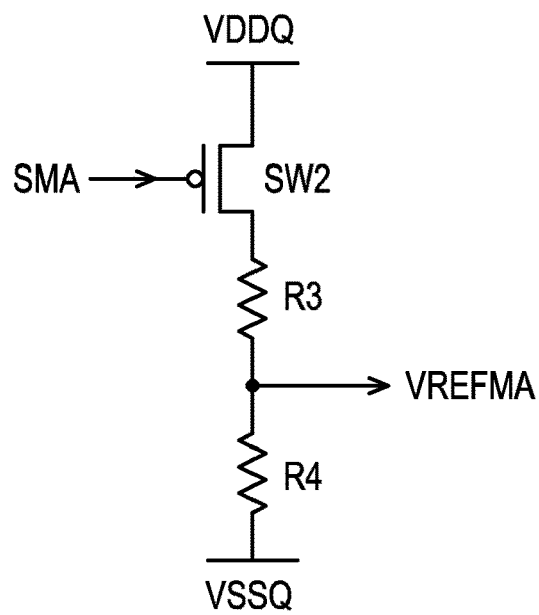
FIG. 4 illustrates a schematic diagram of a master reference voltage generator according to an embodiment of the disclosure.

Please refer to FIG. 2 and FIG. 4, FIG. 4 illustrates a schematic diagram of a master reference voltage generator according to an embodiment of the disclosure. In the embodiment, the master reference voltage generator 222 includes a master switch SW2 and master resistor R3 and R4. A first terminal of the master switch SW2 is coupled to a reference high voltage VDDQ. A control terminal of the master switch SW2 is coupled to the master fuse circuit 221. A first terminal of the master resistor R3 is coupled to a second terminal of the master switch SW2. A second terminal of the master resistor R3 outputs the master reference voltage VREFMA. The master resistor R4 is coupled between the second terminal of the master resistor R3 and a reference low voltage VSSQ. In the embodiment, the master switch SW2 may be implemented by P-type transistor, but the disclosure is not limited thereto.

In the embodiment, when the master fuse circuit 221 does not perform the master fuse setting operation, the master switch SW2 is turned on. When the master fuse circuit 221 finishes the master fuse setting operation, the master switch SW2 is turned off. For example, when the master fuse circuit 221 does not perform the master fuse setting operation, the master fuse circuit 221 provides the master set signal SMA having a low voltage level. Therefore, the master switch SW2 is turned on. The master reference voltage generator 222 generates the master reference voltage VREFMA according to a voltage difference between the reference high voltage VDDQ and the reference low voltage VSSQ, a resistance value of the master resistor R3 and a resistance value of the master resistor R4. When the master fuse circuit 221 finishes the master fuse setting operation, the master fuse circuit 221 provides the master set signal SMA having a high voltage level. Therefore, the master switch SW2 is turned off. Therefore, the master reference voltage generator 222 does not generate the master reference voltage VREFMA. For example, the master fuse setting operation is a disable setting operation of the master DRAM chip 220. When the master fuse setting operation is finished, the master reference voltage generator 222 does not generate the master reference voltage VREFMA. In this way, when the master DRAM chip 220 is disabled, the master reference voltage generator 222 does not generate the master reference voltage VREFMA, so as to decrease a power consumption of the master DRAM chip 220.

In some embodiments, the master DRAM chip 220 may control the slave DRAM chips 210_1 to 210_n when the master fuse circuit 221 does not perform the master fuse setting operation.

In some embodiments, each of the slave fuse circuit 111_1 to 111_n and the master fuse circuit 221 may be implemented by any type of an e-fuse circuit, but the disclosure is not limited thereto In view of the foregoing, each of the slave DRAM chips provides the slave reference voltage according to the slave fuse setting operation. Therefore, a power consumption of the DRAM device could be decreased. For example, the slave fuse setting operation is a disable setting operation of the slave DRAM chip. When the slave fuse setting operation is finished, the slave reference voltage generator is disabled, the slave reference voltage generator does not generate the slave reference voltage, so as to decrease the power consumption.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A dynamic random-access memory (DRAM) device, comprising:
   a plurality of slave DRAM chips, wherein each of the plurality of slave DRAM chips comprises:
      a slave fuse circuit, configured to provide a slave set signal according to a slave fuse setting operation of the slave fuse circuit; and
      a slave reference voltage generator, configured to provide a slave reference voltage according to the slave set signal, wherein when the slave fuse circuit finishes the slave fuse setting operation, the slave reference voltage generator stops providing the slave reference voltage; and
   a master DRAM chip, coupled to the plurality of slave DRAM chips, and configured to control operations of the plurality of slave DRAM chips.

2. The DRAM device of claim 1, wherein when the slave fuse circuit does not perform the slave fuse setting operation, the slave reference voltage generator provides the slave reference voltage.

3. The DRAM device of claim 1, wherein the slave reference voltage generator comprises:
   a slave switch, a first terminal of the slave switch is coupled to a reference high voltage, a control terminal of the slave switch is coupled to the slave fuse circuit;
   a first slave resistor, a first terminal of the first slave resistor is coupled to a second terminal of the slave switch, a second terminal of the first slave resistor outputs the slave reference voltage; and
   a second slave resistor, coupled between the second terminal of the first slave resistor and a reference low voltage.

4. The DRAM device of claim 3, wherein:
   when the slave fuse circuit does not perform the slave fuse setting operation, the slave switch is turned on, and
   when the slave fuse circuit finishes the slave fuse setting operation, the slave switch is turned off.

5. The DRAM device of claim 1, wherein the master DRAM chip comprises:
   a master fuse circuit, configured to provide a master set signal according to a master fuse setting operation of the master fuse circuit; and
   a master reference voltage generator, configured to provide a master reference voltage according to the master set signal.

6. The DRAM device of claim 5, wherein when the master fuse circuit does not perform the master fuse setting operation, the master reference voltage generator provides the master reference voltage.

7. The DRAM device of claim 5, wherein when the master fuse circuit finishes the master fuse setting operation, the master reference voltage generator stops providing the master reference voltage.

8. The DRAM device of claim 5, wherein each of the master reference voltage and the slave reference voltage is a reference voltage for determining a logic level of a received data.

9. The DRAM device of claim 5, wherein the master reference voltage generator comprises:
   a master switch, a first terminal of the master switch is coupled to a reference high voltage, a control terminal of the master switch is coupled to the master fuse circuit;
   a first master resistor, a first terminal of the first master resistor is coupled to a second terminal of the master switch, a second terminal of the first master resistor outputs the master reference voltage; and
   a second master resistor, coupled between the second terminal of the first master resistor and a reference low voltage.

10. The DRAM device of claim 9, wherein:
    when the master fuse circuit does not perform the master fuse setting operation, the master switch is turned on, and
    when the master fuse circuit finishes the master fuse setting operation, the master switch is turned off.

11. The DRAM device of claim 1, wherein the plurality of slave DRAM chips and the master DRAM chip are stacked from each other.

* * * * *